April 7, 1925. 1,532,184
B. B. KAHN
TOASTER
Filed July 30, 1923 2 Sheets-Sheet 1

Witness
Inventor
Bertrand B. Kahn
By Robert M. Sye, Atty

April 7, 1925.  
B. B. KAHN  
TOASTER  
Filed July 30, 1923    2 Sheets-Sheet 2
1,532,184
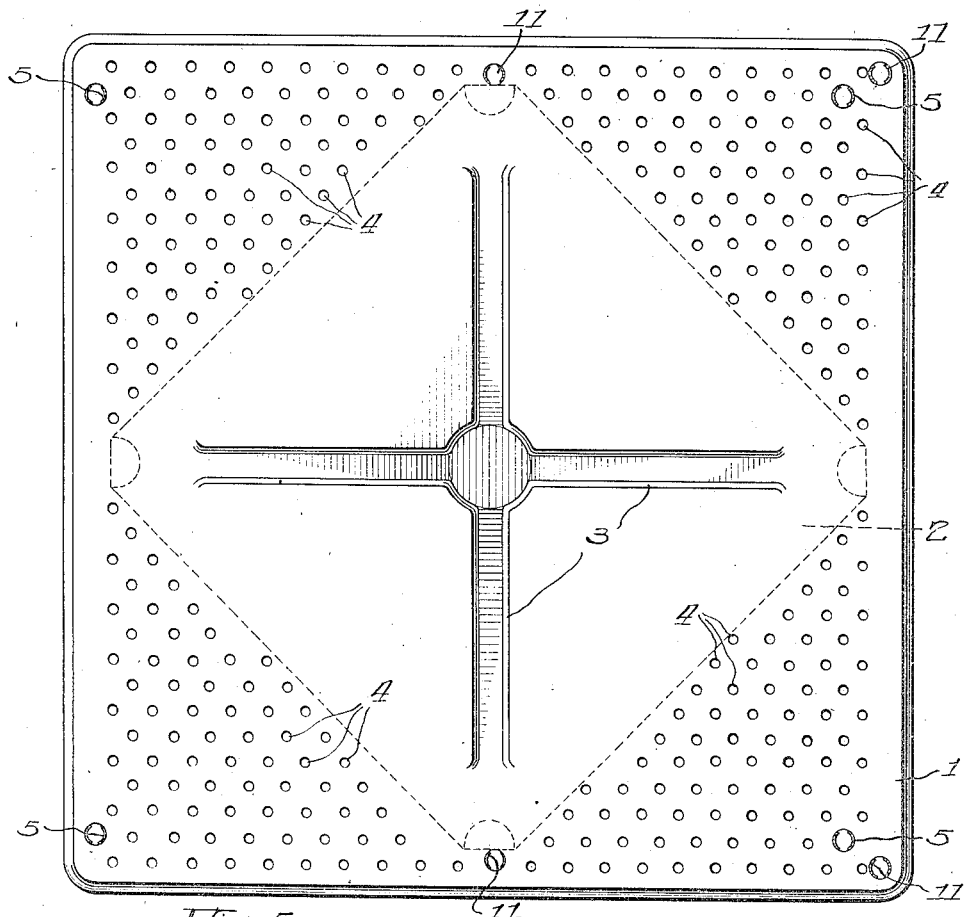
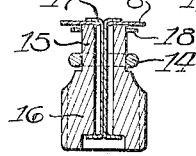
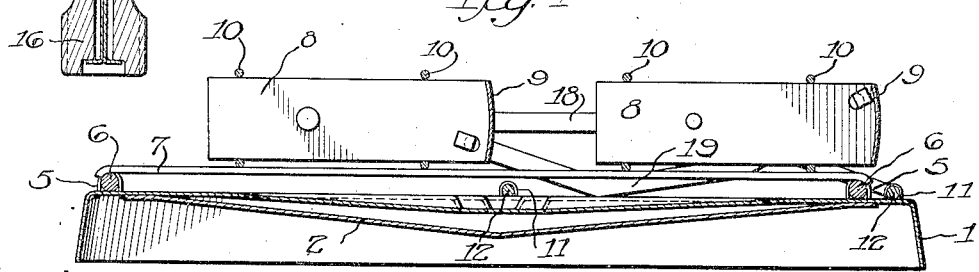
Witness
Inventor
Bertrand B. Kahn
By Robert M. Sr Atty Patented Apr. 7, 1925.

1,532,184

UNITED STATES PATENT OFFICE.

BERTRAND B. KAHN, OF HAMILTON, OHIO, ASSIGNOR TO THE ESTATE STOVE COMPANY, OF HAMILTON, OHIO, A CORPORATION OF OHIO.

TOASTER.

Application filed July 30, 1923. Serial No. 654,639.

*To all whom it may concern:*

Be it known that I, BERTRAND B. KAHN, a citizen of the United States, residing at Hamilton, in the county of Butler and State of Ohio, have invented a certain new and useful Improvement in Toasters, of which the following is a full, clear, concise and exact description, reference being had to the accompanying drawings forming a part of this specification.

The present invention relates to toasters and its principal object is the provision of simply and conveniently operable means for presenting opposite sides of several slices to the heating element.

In the drawings, which illustrate a preferred embodiment of the invention,—

Figure 3 is a section on the line 3—3 in Figure 2.

Figure 4 is a section on the line 4—4 in Figure 1, and

Figure 5 is a section on the line 5—5 in Figure 1.

Figure 1:
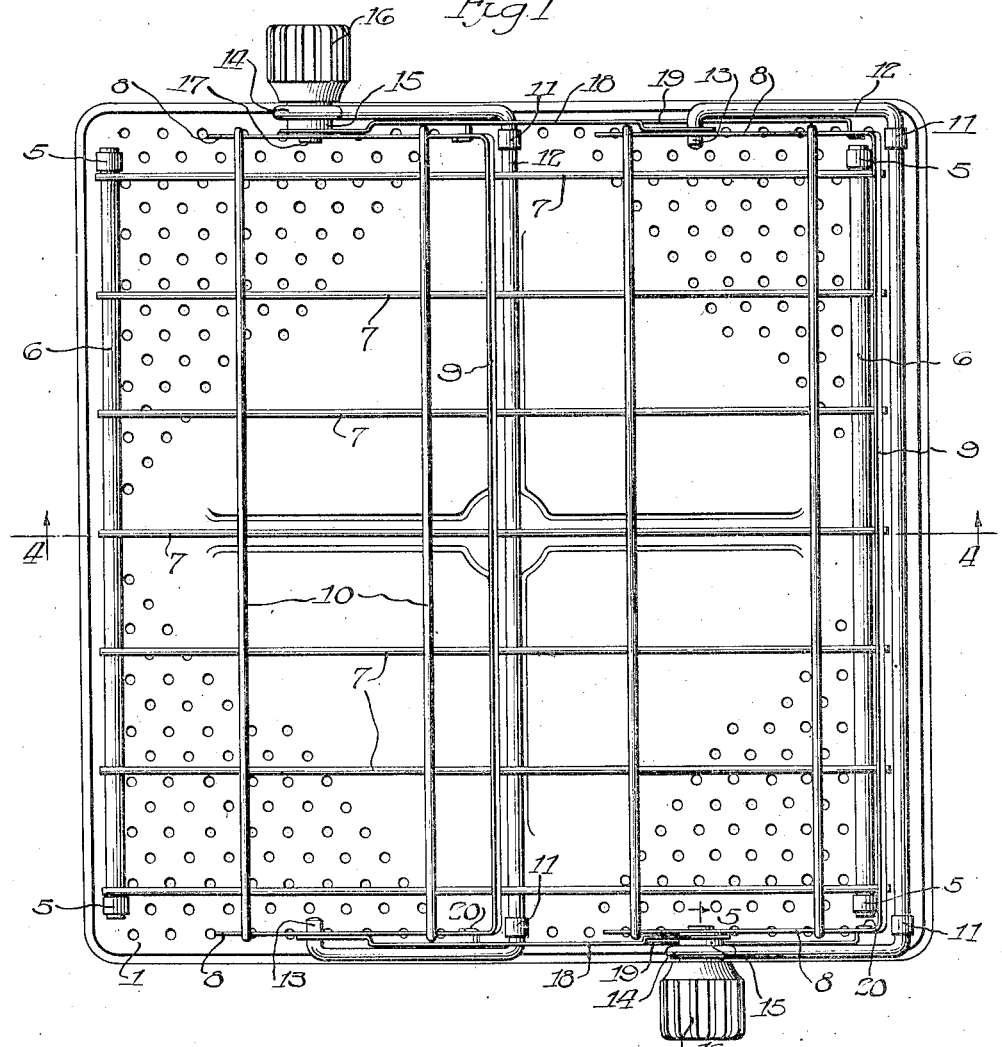
Figure 1 is a plan view of a toaster.
Figure 2:
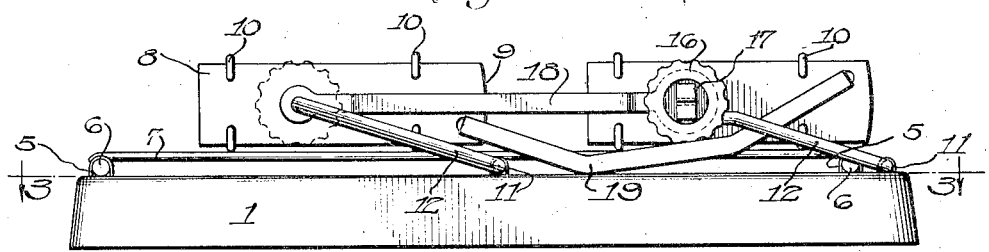
Figure 2 is an end elevation thereof.

The toaster illustrated is designed to be placed over a gas burner and comprises a hollow sheet metal base 1 provided with a re-enforcing plate 2 and strengthening ribs 3. The plate is formed with a plurality of holes 4 for the direct transmission of heat to the slices which are supported above the plate. While the drawings illustrate a toaster designed for use over a gas burner, the mechanism by which the slices are supported may be associated equally well with an electrical heating element.

The base is formed adjacent its four corners with openings to receive the ends of straps 5 which hold bars 6 supporting a plurality of rods 7 on which the slice holders are adapted to rest. In the toaster illustrated there are two slice holders, each comprising end plates 8, a side plate 9, and rods 10 connecting the end plates at their upper and lower edges, the holder being open for the insertion of a slice at the side opposite the plate 9. The base is formed with openings in which the ends of pairs of bearings 11 are secured, and a rod 12 is journaled in each pair of bearings 11. At opposite ends of the base the rods 12 are bent at a right angle to the journaled portion of the rod. At one end the rod 12 is bent to form a pivot 13 extending through one of the end plates 8 of the slice holder. The opposite end 14 of the rod 12 is bent around the hub 15 of a knob 16, which is fixedly and non-rotatably secured to the end plate 8 of the slice holder by a fastener 17. Preferably the knobs 16 are at opposite ends of the two slice holders so that the mechanism may be operated from either end. The slice holders are connected at their opposite ends by links 18 formed at one end with openings loosely fitting the pivots 13 of the rods 12 and formed at the other end with openings loosely fitting the hubs 15 of the knobs 16. At their opposite ends the slice holders are also connected by rods 19 having their ends 20 loosely extending through and bent against the end plates 8 of the slice holders. The ends of the rods 19 are connected with the slice holders eccentrically of the pivotal axes formed by the pivots 13 and the hubs 15 and preferably near the side plates 9 of the slice holders.

In operation the operator grasps one of the knobs and raises it, thus swinging the rods 12 and raising the slice holders into horizontal position vertically spaced above the heating element. The links 18 compel uniform raising and lowering of both slice holders. When the slice holders are in raised position the knob is turned until both slice holders, turning uniformly because of the bar 19, are turned on their pivotal axes to present their open sides uppermost. Slices are then inserted between the rods 10 and resting edgewise on side plates 9. The slice holders are then turned back to horizontal position and lowered toward the heating element. When one side of the slices is toasted the operator grasps one of the knobs and raises the holders and, while they are in raised position, turns the knob to reverse both holders and then lowers them to present the opposite sides of the slices to the heating element.

Having thus described my invention, what I claim as new and desire to secure by Letters Patent of the United States is:—

1. In a toaster, the combination of a heating element, a plurality of supports movable toward and from the heating element, a plurality of slice-holders pivotally secured to the respective supports, means for moving the supports simultaneously, and translational means for turning the slice-holders simultaneously.

2. In a toaster, the combination of a heating element, a support oscillatory toward and from the heating element, a slice holder having its opposite ends pivotally secured to said support, and means including translating means to move said slice holder about its pivot.

3. In a toaster, the combination of a heating element, a plurality of supports oscillatory toward and from the heating element, a plurality of slice-holders pivotally secured to the respective supports, means for oscillating the supports simultaneously, and translational means for turning the slice-holders simultaneously.

4. In a toaster, the combination of a base, a plurality of frames swingingly secured to said base, a slice holder for each of said frames and eccentrically pivoted at its ends thereto, means to oscillate said slice holders about their pivots and means to retain said slice holders in relatively parallel relation at all stages of their oscillatory movements.

5. In a toaster, the combination of a base, a plurality of frames each oscillatorily secured at one end to the base, a plurality of slice-holders each pivoted in one of the frames on an axis intermediate the edges of the slice-holder and parallel with the axis of oscillation of the frame, a link connected with the frames equidistantly from their axes of oscillation, and a link connected with the slice-holders eccentrically of their pivotal axes.

6. In a toaster, the combination of a base, a shaft oscillatory on the base and formed at its ends with radial extensions, one of the extensions terminating in a ring and the other in a pivot concentric with the ring and parallel with the shaft, a slice-holder having end plates, one of the plates having an aperture receiving the pivot, and a handle secured to the other end plate and journaled in the ring.

7. In a toaster, the combination of a base, shafts oscillatory on the base and formed at their ends with radial extensions, one of the extensions of each shaft terminating in a ring and the other in a pivot concentric with the ring and parallel with the shaft, the rings being at opposite ends of the shafts, slice-holders having end plates, one of the plates of each slice-holder having an aperture receiving one of the pivots, handles secured to the other end plates of the respective holders and journaled in the rings, a link loosely engaging the pivot of one slice-holder and the handle of the other, and a link loosely connected with the adjacent end plates of the slice-holders eccentrically of their pivoted axes.

8. In a toaster, the combination of a heat distributing element, a plurality of slice holding means having their major axes disposed in parallel planes, a plurality of oscillatory supports for said holding means, and means to rotate said slice holders and oscillate said supports simultaneously while retaining said holding means in relatively parallel planes.

9. In a toaster, the combination of a heat distributing element, a plurality of pivoted slice holders having their longitudinal axes on the same side of said element, a plurality of oscillatory supports for said holder, means to oscillate said supports simultaneously, and means to rotate said holders simultaneously.

10. In a toaster, in combination, horizontally disposed heat distributing element, a plurality of slice holders, a plurality of oscillatory supports pivoted to said holders, means to oscillate and rotate one of said holders, and means cooperative with said first mentioned means to simultaneously oscillate and rotate another holder.

11. In a toaster, in combination, a horizontally disposed heat distributing element, a plurality of slice holders adapted to adjacently repose upon one side of said element, a plurality of oscillatory supports connected to one side of said element and pivoted to said holders, means to oscillate and rotate one of said holders, and means cooperative with said first mentioned means to simultaneously oscillate and rotate another holder.

12. In a toaster, the combination of a horizontally disposed heating element, a plurality of supports pivoted to and oscillatorily movable across one face of said element, a plurality of slice holders pivotally secured to respective supports, means for moving the supports simultaneously, and translating means for turning the slice holders simultaneously about their pivots.

13. In a toaster, the combination of a horizontally disposed heating element, a plurality of supports, adapted to oscillate across the top face of said element, a plurality of slice holders pivotally secured to respective supports, means for oscillating the supports simultaneously, and translating means pivotally secured to the slice holders for reversing said slice holders simultaneously.

In witness whereof, I hereunto subscribe my name this 25 day of July, 1923.

BERTRAND B. KAHN.